(12) United States Patent
Deng et al.

(10) Patent No.: US 12,005,942 B2
(45) Date of Patent: Jun. 11, 2024

(54) VEHICLE RUNNING SYSTEM AND METHOD BASED ON RAIL TRANSPORT

(71) Applicant: Southwest Jiaotong University, Chengdu (CN)

(72) Inventors: Zigang Deng, Chengdu (CN); Kaiwen Li, Chengdu (CN); Jun Zheng, Chengdu (CN); Xin Liu, Chengdu (CN); Le Liang, Chengdu (CN); Yihao Chen, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/483,469

(22) Filed: Oct. 9, 2023

(65) Prior Publication Data

US 2024/0043054 A1 Feb. 8, 2024

Related U.S. Application Data

(63) Continuation of application No. PCT/CN2023/106779, filed on Jul. 11, 2023.

(30) Foreign Application Priority Data

Apr. 11, 2023 (CN) .......................... 202310376141.2

(51) Int. Cl.
*B61L 27/04* (2006.01)
*B60L 13/04* (2006.01)
(Continued)

(52) U.S. Cl.
CPC .............. *B61L 27/04* (2013.01); *B60L 13/04* (2013.01); *B61L 27/16* (2022.01); *B61L 27/50* (2022.01); *B60L 2200/26* (2013.01)

(58) Field of Classification Search
CPC .......... B61L 27/04; B61L 27/16; B61L 27/50; B60L 13/04; B60L 2200/26
See application file for complete search history.

(56) References Cited

U.S. PATENT DOCUMENTS

| 2004/0064235 | A1 | 4/2004 | Cole |
| 2007/0089636 | A1 | 4/2007 | Guardo, Jr. |
| 2010/0235090 | A1* | 9/2010 | Borowy ................. B60L 13/06 104/284 |

FOREIGN PATENT DOCUMENTS

| AU | 2002215698 B2 | 8/2005 |
| CN | 105083335 A | 11/2015 |

(Continued)

OTHER PUBLICATIONS

Hu Xiao et al., "Distribution and unsteady characteristics of the temperature and pressure loads acting on the car-body in evacuated tube maglev transport", Journal of Experiments in Fluid Mechanics, vol. 37, No. 1, Feb. 28, 2023, pp. 9-28.

*Primary Examiner* — Robert J McCarry, Jr.

(57) ABSTRACT

A vehicle running system based on rail transport, including a track, a framework, two levitation devices and a running device. The track is provided with a slot, in which the framework is provided. The levitation devices are provided between the track and the framework, and a top surface of the levitation device is fixedly connected to a bottom surface of the framework through a suspension structure. The running device includes two conductor plates and two running structures. The conductor plates are fixedly arranged on the inner wall of the slot, and are corresponding to the running structures. The reluctance force of magnetic wheels is converted into a driving force to drive maglev vehicles, and the levitation force is converted into a guiding force to realize the self-stabilization of vehicle guidance. A vehicle running method based on this system is also provided.

7 Claims, 4 Drawing Sheets

(51) Int. Cl.
    *B61L 27/16*     (2022.01)
    *B61L 27/50*     (2022.01)

(56)         References Cited

FOREIGN PATENT DOCUMENTS

| | | | |
|---|---|---|---|
| CN | 106427661 A | 2/2017 | |
| CN | 106627245 A | 5/2017 | |
| CN | 107776613 A | 3/2018 | |
| CN | 107862864 A | 3/2018 | |
| CN | 110281779 A | 9/2019 | |
| CN | 111942165 A | 11/2020 | |
| CN | 113380037 A | 9/2021 | |
| CN | 113415169 A | 9/2021 | |
| CN | 214450972 U | 10/2021 | |
| CN | 217155862 U | 8/2022 | |
| CN | 115214741 A | 10/2022 | |
| CN | 115723582 A | 3/2023 | |
| CN | 115723582 A * | 3/2023 | ............ B60L 13/10 |
| CN | 218777419 U | 3/2023 | |
| CN | 115892034 A | 4/2023 | |
| CN | 116080413 A | 5/2023 | |

* cited by examiner

VEHICLE RUNNING SYSTEM AND METHOD BASED ON RAIL TRANSPORT

CROSS-REFERENCE TO RELATED APPLICATIONS

This application is a continuation of International Patent Application No. PCT/CN2023/106779, filed on Jul. 11, 2023, which claims the benefit of priority from Chinese Patent Application No. 202310376141.2, filed on Apr. 11, 2023. The content of the aforementioned application, including any intervening amendments thereto, is incorporated herein by reference in its entirety.

TECHNICAL FIELD

This application relates to the technical field of rail transport, and more particularly to a vehicle running system and method based on rail transport.

BACKGROUND

Currently, magnetic levitation (Maglev) lines mainly adopt a long-stator linear synchronous motor (LS-LSM) and a short-stator linear induction motor (SS-LIM). A primary winding of the LS-LSM is laid on guide rails and a secondary winding is arranged on the train bottom. The control system of the LS-LSM is complex and expensive. The SS-LEVI struggles with poor efficiency and driving force, and the stator and the power supply are provided on the train, increasing the overall weight of the train. Moreover, it is also required to supply current to the train through a conductive rail. Therefore, there is a need for a vehicle running system and method with high efficiency, low cost, large traction and braking forces and simpler motor control strategy.

SUMMARY

An object of this application to provide a vehicle running system and method based on rail transport to overcome the above problems.

The technical solutions of this disclosure are described as follows.

On one hand, this application provides a vehicle running system based on rail transport, comprising:
  a track;
  a framework;
  two levitation devices; and
  a running device;
  wherein the track is provided with a slot; and the framework is provided in the slot of the track;
  the two levitation devices are both provided between the track and the framework;
  a top surface of each of the two levitation devices is fixedly connected to a bottom surface of the framework via a suspension structure; and
  the running device comprises two conductor plates and two running structures; the two conductor plates are fixedly provided on an inner side wall of the slot; the two running structures are in one-to-one correspondence with the two conductor plates; each of the two running structures comprises a magnetic wheel, a first support frame, a reverse gear box and a motor; the motor is fixedly provided on the framework; an output end of the motor is connected to the reverse gear box; a bottom of the reverse gear box is sleevedly provided with the magnetic wheel; and a bottom end of the reverse gear box is fixedly connected to the framework through the first support frame.

On the other hand, this application further provides a vehicle running method based on rail transport, comprising:
  (S1) acquiring real-time map information and historical train operation information sent by a console, wherein the historical train operation information comprises historical real-time map information and historical traveling information of train operation;
  (S2) sending the historical real-time map information and the real-time map information to a target detection model for target detection to determine a distinguishing feature between the historical train operation information and the real-time map information;
  (S3) sending the distinguishing feature and the historical train operation information to a traveling speed prediction model for speed prediction, and performing an error compensation via an error compensation module to obtain a vehicle speed prediction information; and
  (S4) generating a control command based on the vehicle speed prediction information, wherein the control command comprises a command for controlling the vehicle running system to travel according to the vehicle speed prediction information.

Compared to the prior art, this disclosure has the following beneficial effects.

Regarding the system provided herein, it is only required to control the rotary motor to drive the magnetic wheel to rotate at a certain operation speed to reach the uniform motion. The magnetic wheel is mounted on the vehicle body, and the conductor plates are located at both sides of the vehicle body, such that the construction cost is greatly reduced when compared to the long-distance laying of the primary winding on tracks. The magnetic reluctance force of the magnetic wheel can be converted into driving force to drive the magnetic levitation (maglev) vehicle to travel with a lower rotating speed, a lower motor power and a greater driving force. The energy loss increase, only lies in the eddy-current loss in the aluminum plate compared to ordinary asynchronous motors. In addition, the number of magnetic wheels can be flexibly adjusted according to the power demand. Moreover, the levitation force is converted into the guiding force, and due to the negative stiffness of the guiding force, the self-stabilization of the vehicle guidance can be achieved. In addition to achieve the traction function of the linear motors in the maglev transport, this application also enables the integration of guidance, braking, and generation, storage and consumption of electricity.

Other features and advantages of this application will be set forth below, and will partly become apparent from the specification or be understood by implementing the embodiments of this application. The objects and other advantages of this application may be realized and obtained by means of the structure particularly indicated in the specification, claims and accompanying drawings.

BRIEF DESCRIPTION OF THE DRAWINGS

The accompanying drawings needed in the description of embodiments of the disclosure will be briefly introduced as follows to more clearly illustrate the technical solutions in the embodiments of this application. It should be understood that the following drawings only show some embodiments of this application, so that they shall not be considered as limitations to the scope of the disclosure. For those skilled in the art, other relevant drawings may be obtained according to these drawings without making creative effort.

Figure 1:
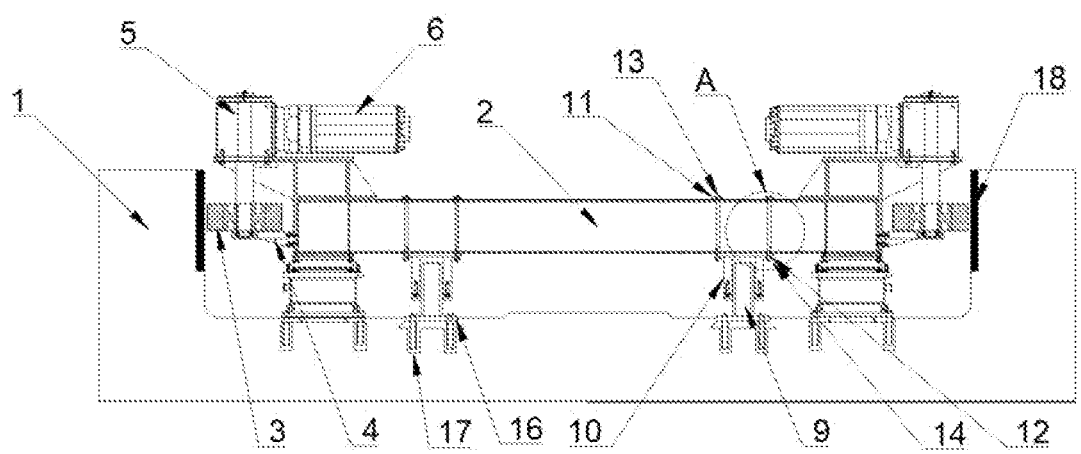
FIG. 1 is a front view of a vehicle running system based on trail transport in accordance with an embodiment of this disclosure.

In the drawings, 1—track; 2—framework; 3—magnetic wheel; 4—first support frame; 5—reverse gearbox; 6—motor; 7—power supply; 8—upper computer; 9—support wheel; 10—second support frame; 11—first washer; 12—second washer; 13—bolt; 14—nut; 15—guiding wheel; 16—support plate; 17—trapezoidal connecting frame; and 18—conductor plate.

DETAILED DESCRIPTION OF EMBODIMENTS

To make the objects, technical solutions and advantages of the embodiments of this application clearer, the technical solutions of the embodiments of this application will be clearly and completely described below in conjunction with the accompanying drawings. It is obvious that described below are some embodiments instead of all embodiments of this application. The components of embodiments of this application described and illustrated in the drawings herein can be generally arranged and designed in different configurations. Accordingly, the following detailed description of the embodiments of this application provided in the accompanying drawings is not intended to limit the protection scope of this application, but is merely used for illustrating the selected embodiments of this application. Based on the embodiments in this application, all other embodiments obtained by those skilled in the art without making creative effort shall fall within the protection scope of this application.

It should be noted that similar symbols and letters denote similar items in the following drawings, so that once an item has been defined in one drawing, it is not required to further define and explain such item in subsequent drawings. As used herein, the terms "first", "second", etc. are used only for distinguishment, and are not to be understood as indicating or implying relative importance.

Embodiment 1

Figure 2:
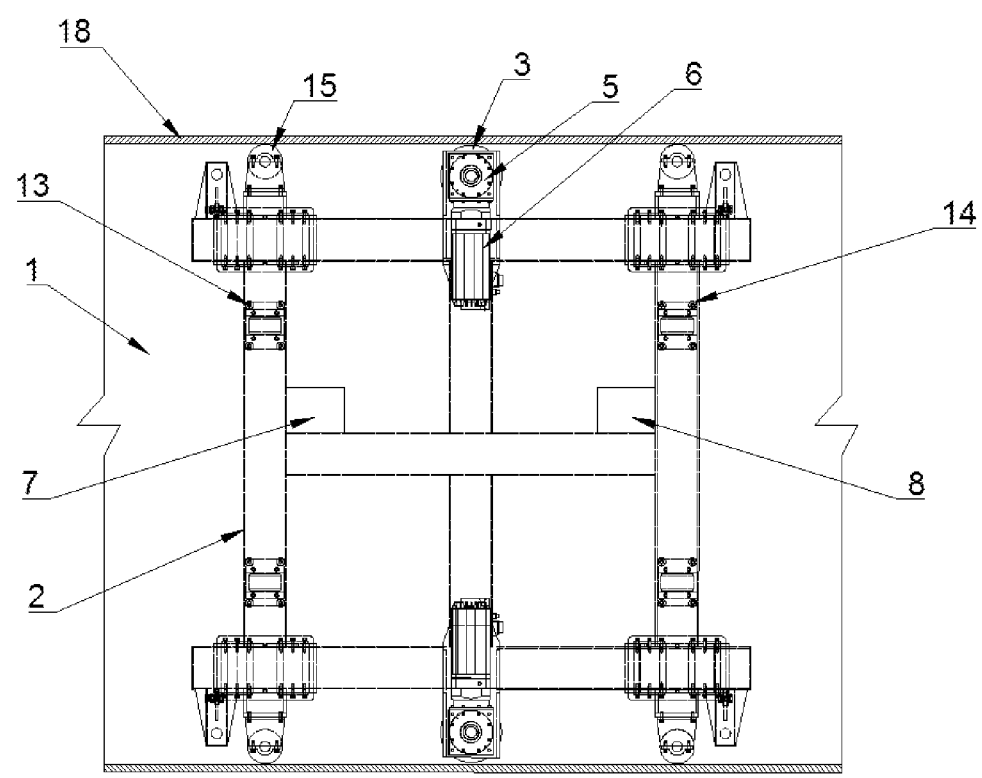
FIG. 2 is a top view of the vehicle running system in accordance with an embodiment of this disclosure.
Figure 3:
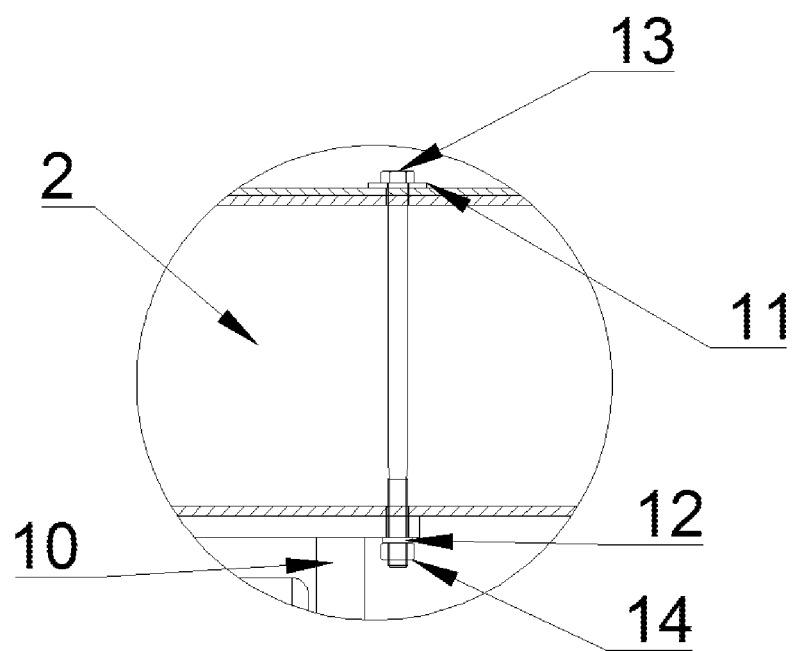
FIG. 3 is an enlarged view of portion "A" shown in FIG. 1.

As shown in FIGS. 1, 2 and 3, this embodiment provides a vehicle running system based on rail transport, including a track 1 having a slot, a framework 2 provided in the slot of the track 1, two levitation devices and a running device. The levitation devices are provided between the track 1 and the framework 2, and a top surface of each of the levitation devices is fixedly connected to a bottom surface of the framework 2 via a suspension structure. The traveling device includes two conductor plates 18 and two running structures. The conductor plates 18 are fixedly provided on an inner wall of the slot, and are in one-to-one correspondence to the running structures. The running structure includes a magnetic wheel 3, a first support frame 4, a reverse gear box 5 and a motor 6. The motor 6 is fixedly provided on the framework 2, and an output end of the motor 6 is connected to the reverse gear box 5. A bottom of the reverse gear box 5 is sleevedly provided with the magnetic wheel 3, and a bottom end of the reverse gear box 5 is fixedly connected to the framework 2 through the first support frame 4.

Regarding the system provided herein, it is only required to control the rotary motor to drive the magnetic wheel to rotate at a certain operation speed to reach the uniform motion. The magnetic wheel is mounted on the vehicle body, and the conductor plates are located at both sides of the vehicle body, such that the construction cost is greatly reduced when compared to the long-distance laying of the primary winding on tracks. The magnetic reluctance force of the magnetic wheel can be converted into driving force to drive the magnetic levitation (maglev) vehicle to travel with a lower rotating speed, a lower motor power and a greater driving force. The energy loss increase, only lies in the eddy-current loss in the aluminum plate compared to ordinary asynchronous motors. In addition, the number of magnetic wheels can be flexibly adjusted according to the power demand. Moreover, the levitation force is converted into the guiding force, and due to the negative stiffness of the guiding force, the self-stabilization of the vehicle guidance can be achieved. In addition to achieving the traction function of the linear motors in the maglev transport, this application also enables the integration of guidance, braking, and generation, storage and consumption of electricity.

The number of the magnetic wheel 3 is two, and the two magnetic wheels 3 are both in a ring shape and configured in a Halbach permanent magnet array. Individual permanent magnet units forming the magnetic wheels 3 are in the same magnetization direction, and the magnetic wheels at two sides rotate in opposite directions during operation.

The ring-shaped Halbach permanent magnet wheels are provided on two sides of the vehicle body in this application, respectively. The Halbach structure is a magnet array structure. The Halbach structure of this disclosure is a ring-shaped permanent magnet wheel structure composed of at least four permanent magnets, where the angle between the magnetic induction lines of adjacent permanent magnets is 90°, and the magnetic induction lines of adjacent permanent magnets rotate in the clockwise direction. Specifically, the permanent magnet wheels are mounted on the framework 2, and the motor 6 is mounted on the framework 2 and then connected with the permanent magnet wheels through a reverse mechanism. Controlling the rotation of the motors 6 at two sides will drive the permanent magnet wheels at two sides to rotate. There is a certain gap between the permanent magnet wheels, at which the conductor plates 18 are provided and are fixed to two sides of the track. When driven by the motors 6 to rotate, the permanent magnet wheels will interact with the conductor plates 18 to generate the guiding force and driving force, respectively, thus gradually realizing the traction, guiding and braking function.

Specifically, the framework 2 is further provided with a power supply 7 and an upper computer 8, which are electrically connected with the levitation devices, respectively.

By arranging the power supply 7 and the upper computer 8 on the framework 2, this application realizes automatic control of the vehicle traveling function.

The framework 2 is further provided with two support devices, which are fixedly connected to the bottom surface of the framework 2, and are provided between the two levitation devices.

It is to be understood that the two support devices are configured to support the vehicle when it is not started to reduce the energy consumed for starting the vehicle.

The support device includes a support wheel 9, a second support frame 10, a first washer 11, a second washer 12, a bolt 13 and a nut 14. The top portion of the second support frame 10 is fixedly provided on the framework 2 via the bolt 13 and the nut 14. The first washer 11 is provided between the bolt 13 and the upper surface of the framework 2, and the second washer 12 is provided between the nut 14 and the second support frame 10. Both the first washer 11 and the second washer 12 are sleeved on the bolt 13, and the support wheel 9 is provided on the bottom portion of the second support frame 10.

This application can effectively prevent the deviation of the support wheels and reduce operation risk by means of the support wheel 9 and the second support frame 10 provided on the framework 2.

The track 1 is further provided with a support plate 16 and a trapezoidal connecting frame 17. The support plate 16 is provided at the bottom of the slot of the track 1 directly below the support wheel 9, and is fixedly provided in the slot of the track 1 via the trapezoidal connecting frame 17.

This application reduces the wear and tear of the concrete under the track 1 and the friction between the track 1 and the support wheel 9 by means of the support plate 16 and the trapezoidal connecting frame 17 provided on the track 1, so as to facilitate the safe operation of trains.

The framework 2 is further provided with a guiding wheel 15. The horizontal height of the guiding wheel 15 is the same as that of the magnetic wheel 3, and the guiding wheel 15 is in contact with the conductor plate 18.

By arranging the guiding wheels 15 on two sides of the framework 2, this application can effectively prevent vehicles from swaying from side to side within the track 1 to enable the safe guidance and normal operation of trains.

Embodiment 2

Figure 4:
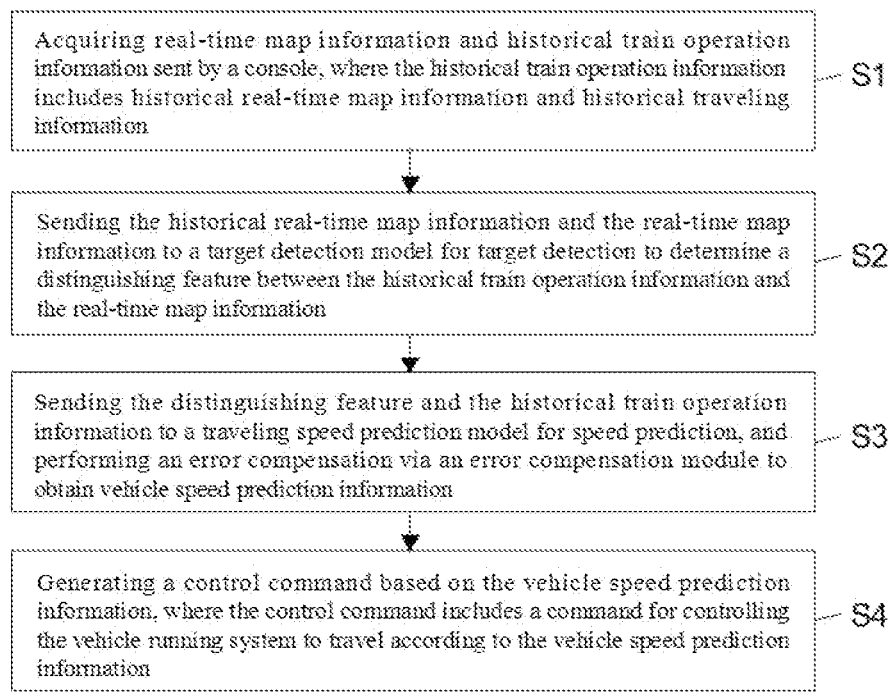
FIG. 4 is a flow chart of a vehicle running method in accordance with an embodiment of this disclosure.

FIG. 4 illustrates a vehicle running method based on rail transport, including steps (S1)—(S4).

Step (S1) Real-time map information and historical train operation information sent from the console are acquired, where the historical train operation information includes the historical real-time map information and the historical traveling information of train operation.

It is to be understood that in step (S1), the map information of the route that the train passes through during the real-time operation and the historical train operation information sent by the console are obtained via the upper computer to prepare for the prediction of the vehicle traveling speed.

Step (S2) The historical real-time map information and the real-time map information are sent to the target detection model for target detection to determine distinguishing features between the historical train operation information and the real-time map information.

It is to be understood that in step (S2), the target detection is performed between the historical real-time map information and the real-time map information to determine differences between the historical map and the real-time map, so as to prevent the overturn of trains caused by inconsistencies in the maps. Step (S2) includes step (S21), step (S22) and step (S23).

Step (S21) Each image frame of the historical real-time map information and each image frame of the real-time map information are divided into at least two image blocks of equal size. The center point and edge points of four corners of each image block are taken as feature points to obtain all feature points in each image frame.

Step (S22) All feature points in the historical real-time map information and all feature points in the real-time map information are compared in real time. Specifically, all the feature points are subjected to coordinate transformation, and images in the real-time map information respectively corresponding to individual image frames in the historical real-time map information are determined based on Euclidean distances and trace of a Hessian matrix.

Step (S23) Different regions between each image frame in the historical real-time map information and the corresponding image thereof are determined based on the edge detection algorithm, where whether the edge target images in the pairwise corresponding images are the same is determined by comparison, and different edge target images act as the distinguishing features.

It is to be understood that in this step, the historical real-time map information and the real-time map information are both divided into a plurality of image blocks, and all feature points in each image frame are determined. Then the feature point comparison is performed to determine different images in each frame, so as to further determine whether the edge target images in the different images in each frame are the same. The edge target images are the rail inclination angle and the rail height. If they are different, the different edge target images will be used as the distinguishing features.

Step (S3) The distinguishing features and the historical train operation information are sent to a traveling speed prediction model for speed prediction, and the error compensation is performed via an error compensation module to obtain vehicle speed prediction information.

It is to be understood that in this step, the current real-time traveling speed of the train is predicted through the historical train operation to ensure the smooth and safe operation of the train without delay, improving the train operation efficiency. The step (S3) includes step (S31), step (S32) and step (S33).

Step (S31) The historical train operation information is divided into a training set and a validation set.

Step (S32) The training set is sent to a trained LSTM (Long Short-Term Memory) neural network as an input parameter for speed prediction. The prediction results are compared with the validation set to obtain comparison results.

Step (S33) The correlation analysis is performed between individual comparison results and the distinguishing features to obtain a correlation degree of each comparison result with the distinguishing features. The hyperparameters of the LSTM neural network are adjusted according to the correlation degree are adjusted, and the vehicle speed prediction information is obtained according to the adjusted LSTM neural network.

It is to be understood that in this step, the historical train operation information is divided into a training set and a validation set, and the LSTM neural network is trained. Then the trained results and the validation results are compared and analyzed to determine the correlation degree. The hyperparameters of the LSTM neural network are adjusted based on the correlation degree. The traveling speed of vehicles is predicted through the adjusted LSTM neural network to enable the stable operation and prevent vehicles from running too fast.

Step (S4) A control command is generated based on the vehicle speed prediction information, where the control command includes a command for controlling the vehicle running system to travel according to the vehicle speed prediction information.

It is to be understood that the traveling method includes comparison of the control command information with the operation speed information of vehicles, and determination of the required operation information based on the comparison results, where the operation information includes acceleration, uniform motion and deceleration. If the speed required in the control command information is greater than the operation speed information of vehicles, it is determined that the vehicles are required to be accelerated; if the required speed is equal to the operation speed information, the vehicles need to travel at a constant speed; and if the required speed is less than the operation speed information, the vehicles need to be decelerated. Moreover, the levitation device and the traveling device of vehicles are controlled according to the required operation information of vehicles.

Described above are merely preferred embodiments of this application, and are not intended to limit this application. It should be understood by those skilled in the art that any modifications, equivalent substitutions, and improvements made without departing from the spirit of this application shall be included in the scope of this application defined by the appended claims.

What is claimed is:

1. A vehicle running system based on rail transport, comprising:
    a track;
    a framework;
    two levitation devices; and
    a running device;
    wherein the track is provided with a slot; and the framework is provided in the slot;
    the two levitation devices are both provided between the track and the framework; a top surface of each of the two levitation devices is fixedly connected to a bottom surface of the framework via a suspension structure; and
    the running device comprises two conductor plates and two running structures; the two conductor plates are fixedly provided on an inner side wall of the slot; the two running structures are in one-to-one correspondence with the two conductor plates; each of the two running structures comprises a magnetic wheel, a first support frame, a reverse gear box and a motor; the motor is fixedly provided on the framework; an output end of the motor is connected to the reverse gear box; a bottom of the reverse gear box is sleevedly provided with the magnetic wheel; and a bottom end of the reverse gear box is fixedly connected to the framework through the first support frame.

2. The vehicle running system of claim 1, wherein the number of the magnetic wheel is two, and two magnetic wheels are both in a ring shape; the two magnetic wheels are both configured in a Halbach permanent magnet array; and magnetic induction lines of the two magnetic wheels are configured in opposite directions.

3. The vehicle running system of claim 1, wherein the framework is further provided with a power supply and an upper computer, and the power supply and the upper computer are electrically connected with the two levitation devices.

4. The vehicle running system of claim 1, wherein the framework is further provided with two support devices; and the two support devices are fixedly connected to the bottom surface of the framework, and are provided between the two levitation devices.

5. The vehicle running system of claim 4, wherein each of the two support devices comprises a support wheel, a second support frame, a first washer, a second washer, a bolt and a nut; a top portion of the second support frame is fixedly provided on the framework through the bolt and the nut; the first washer is provided between the bolt and a top surface of the framework, and the second washer is provided between the nut and the second support frame; both the first washer and the second washer are sleevedly provided on the bolt; and the support wheel is provided on a bottom portion of the second support frame.

6. The vehicle running system of claim 5, wherein the track is further provided with a support plate and a trapezoidal connecting frame; the support plate is provided at a bottom of the slot of the track, and is located directly below the support wheel; and the support plate is fixedly provided in the slot of the track via the trapezoidal connecting frame.

7. The vehicle running system of claim 1, wherein the framework is further provided with a guiding wheel; a height of the guiding wheel is the same as a height of the magnetic wheel; and the guiding wheel is in contact with the two conductor plates.

* * * * *